(12) United States Patent
Webb et al.

(10) Patent No.: US 9,697,521 B2
(45) Date of Patent: *Jul. 4, 2017

(54) AUTHENTICATION SYSTEM AND METHOD

(71) Applicant: JPMorgan Chase Bank, N.A., New York, NY (US)

(72) Inventors: Timothy A. Webb, Elkton, MD (US); Tracy M. Pletz, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,783

(22) Filed: Feb. 19, 2016

(65) Prior Publication Data

US 2016/0171500 A1 Jun. 16, 2016

Related U.S. Application Data

(63) Continuation of application No. 14/453,774, filed on Aug. 7, 2014, now Pat. No. 9,269,085, and a continuation of application No. 13/567,153, filed on Aug. 6, 2012, now Pat. No. 8,826,371, and a continuation of application No. 12/041,033, filed on Mar. 3, 2008, now Pat. No. 8,255,971.

(51) Int. Cl.
*G06F 21/33* (2013.01)
*G06Q 20/40* (2012.01)

(52) U.S. Cl.
CPC ......... *G06Q 20/4016* (2013.01); *G06F 21/33* (2013.01); *G06Q 20/405* (2013.01); *G06Q 20/4014* (2013.01)

(58) Field of Classification Search
CPC ............... G06F 21/33; G06Q 20/4016; G06Q 20/40148
See application file for complete search history.

(56) References Cited

U.S. PATENT DOCUMENTS 6,012,045 A * 1/2000 Barzilai ................. G06Q 30/08
 283/67
6,256,737 B1 * 7/2001 Bianco ............... G07C 9/00158
 713/186

(Continued)

*Primary Examiner* — Dao Ho
(74) *Attorney, Agent, or Firm* — Goodwin Procter, LLP

(57) ABSTRACT

Aspects of the invention relate to a customer authentication system for authenticating a customer making a request related to a customer account. The customer authentication system may include multiple application level data receiving and processing mechanisms for receiving customer requests and collecting customer data. The customer authentication system may additionally include a central authentication system for receiving the customer requests and customer data from the multiple application level data receiving and processing mechanisms, the central authentication system determining, based on authentication policy, whether the collected customer data is sufficient to authenticate each customer in order to fulfill the customer request. The central authentication system may return its conclusions and instructions to the multiple application level data receiving and processing mechanisms. The customer authentication system may additionally include a fraud policy system for centrally managing authentication policy implemented by the central authentication system.

25 Claims, 7 Drawing Sheets

(56) References Cited

U.S. PATENT DOCUMENTS

| | | | | |
|---|---|---|---|---|
| 6,453,301 B1* | 9/2002 | Niwa | ............... | G06Q 20/0855 |
| | | | | 705/17 |
| 6,510,513 B1* | 1/2003 | Danieli | ............... | G06F 21/64 |
| | | | | 380/279 |
| 6,516,056 B1* | 2/2003 | Justice | ............... | G06Q 20/4016 |
| | | | | 379/114.01 |
| 7,004,382 B2* | 2/2006 | Sandru | ............... | G06Q 20/042 |
| | | | | 235/375 |
| 7,251,624 B1* | 7/2007 | Lee | ............... | G06Q 30/06 |
| | | | | 705/26.1 |
| 2002/0099649 A1* | 7/2002 | Lee | ............... | G06Q 20/04 |
| | | | | 705/38 |
| 2002/0188574 A1* | 12/2002 | Niwa | ............... | G06Q 20/0855 |
| | | | | 705/64 |
| 2002/0194119 A1* | 12/2002 | Wright | ............... | G06Q 20/04 |
| | | | | 705/38 |
| 2004/0243824 A1* | 12/2004 | Jones | ............... | G06F 21/33 |
| | | | | 713/166 |
| 2006/0282660 A1* | 12/2006 | Varghese | ............... | G06Q 20/341 |
| | | | | 713/155 |
| 2007/0143851 A1* | 6/2007 | Nicodemus | ............... | G06F 21/55 |
| | | | | 726/25 |
| 2008/0133531 A1* | 6/2008 | Baskerville | ............... | G06F 21/6254 |
| 2008/0140576 A1* | 6/2008 | Lewis | ............... | G06Q 10/0635 |
| | | | | 705/67 |
| 2009/0089869 A1* | 4/2009 | Varghese | ............... | G06F 21/31 |
| | | | | 726/7 |
| 2012/0297446 A1* | 11/2012 | Webb | ............... | G06Q 20/4014 |
| | | | | 726/1 |

* cited by examiner

AUTHENTICATION SYSTEM AND METHOD

RELATED APPLICATIONS

This application claims priority to and is a Continuation of U.S. patent application Ser. No. 14/453,774 filed on Aug. 7, 2014, which is a continuation of U.S. patent application Ser. No. 13/567,153 filed on Aug. 6, 2012 and issued as U.S. Pat. No. 8,826,371 on Sep. 2, 2014, which is a continuation of U.S. patent application Ser. No. 12/041,033 filed on Mar. 3, 2008 and issued as U.S. Pat. No. 8,255,971 on Aug. 28, 2012.

TECHNICAL FIELD

Embodiments of the invention are related generally to systems and methods for authenticating a customer attempting to access a financial account or account services, and, more particularly, to a system and method for authenticating a customer in a consistent and appropriate manner through multiple access channels.

BACKGROUND OF THE INVENTION

Customer authentication for credit and debit card users is a critical function that has yielded sub-optimal results. Customer authentication is generally initiated when a customer acquires an account or attempts to use or service the acquired account through one or more of a number of channels. Today, the process of customer authentication is inconsistently supported across channels such as Internet, phone, bank branches, and ATMs. Currently, financial institutions embed authentication policy within each internal application and the applications accessed may vary depending on the channel through which interaction occurs.

A customer view of the financial institution is through the channels set forth above. Thus, the customer experiences inconsistent authentication processes when attempting a variety of actions, such as new account screening, transaction authentication, and servicing authentication, through one of a number of channels. FIG. 1B illustrates a typical authentication environment that operates to authenticate customers accessing applications through multiple channels. Customers 102 interact over channels 100 with applications 150. The channels 100 may include for example telephone 100, face-to-face 120, and web 130. The applications may include a VRU application 152, a Branch application 162, and web applications 172 and 182. Each of the servicing applications 150 may include its own authentication rules 154, 164, 174, and 184 respectively. Thus, through each of the channels 110, 120, and 130, customers may be confronted with a different process in order to access services. Without a centrally managed authentication platform, customers are subjected to inconsistent treatment when entering the system through any given channel.

Additionally, because the various applications perform authentication procedures in isolation, no standard format or capability is provided to track, record, and monitor customer interactions. The failure to provide tracking, recording and monitoring results in an inability to detect risky transaction patterns. Individual lines of business within an organization may monitor their own channels, but are unaware of events occurring over other channels. Risky patterns necessitate changes to policy, which currently fail to occur because of the lack of detection of these patterns in the currently existing distributed environment. Even upon detection of risky patterns and subsequent policy changes in the existing systems, in order to effect these changes, each and every servicing application would require modification. Thus the system has an inability to quickly adapt to new threads and emerging technologies.

Furthermore, current systems typically apply authentication policies that fail to differentiate between types of transactions, accounts, or account holders. Thus, the current customer authentication model does not assess or leverage cross-channel transactions or behavioral risk. Currently existing systems fail to capture risky interactions across all channels and lines of businesses and therefore fail to execute risk-based authentication. As a result, authentication policy is typically uniformly applied regardless of the type of interaction or channel, even though some types of interactions are much riskier than others.

Another difficulty with the existing systems is that they fail to combat increasingly sophisticated fraud techniques. Perpetrators of fraud strive to find the point of least resistance and continue to access the system through that point. These are points at which personal information is more easily accessible, placing privacy and security at risk, and resulting in exploitation of customers identities. The technology landscape is advancing rapidly and threats are increasingly sophisticated.

Thus, a solution is needed that considers particulars of the customer, the account, the channel, the application, and the requested interaction. Cross channel risk policy should track, record, and assess cross-channel customer transaction to understand and appropriately apply risk based authentication. The solution should be capable of selecting an appropriate authentication level based on such factors as transaction risk and customer account history. The solution should be centrally managed and executed in order to support appropriate, specific, and consistent strategies.

BRIEF SUMMARY OF THE INVENTION

In one aspect of the invention, a customer authentication system is provided for authenticating a customer making a request related to a customer account. The customer authentication system comprises multiple application level data receiving and processing mechanisms for receiving customer requests and collecting customer data and a central authentication system for receiving the customer requests and customer data from the multiple application level data receiving and processing mechanisms. The central authentication system may determine, based on authentication policy, whether the collected customer data is sufficient to authenticate each customer in order to fulfill the customer request. The central authentication system may additionally return conclusions and instructions to the multiple application level data receiving and processing mechanisms. The customer authentication system may additionally include a fraud policy system for centrally managing authentication policy implemented by the central authentication system.

In another aspect of the invention, an authentication system is provided for authenticating a customer making a request related to a customer account from a receiving application. The receiving application collects customer data from a customer through any one of multiple channels. The authentication system includes an authentication engine for receiving the request and customer data from the receiving application. The authentication system additionally includes a risk assessment engine for accessing a customer profile containing data pertaining to customer activity with respect to the account, for determining a level of risk associated with the customer, and for communicating the risk level to the authentication engine. The authentication system may additionally include a policy rule engine for providing authentication criteria to the authentication engine for authentication of the customer such that the authentication engine may operate to determine whether the customer is sufficiently authenticated based on the risk level provided by the risk assessment engine and the authentication criteria provided by the policy rule engine.

In yet an additional aspect of the invention, a method is provided for authenticating customers making requests related to customer accounts. Each customer may make a request through any one of multiple channels and each request may be received by any one of multiple processing applications, the multiple processing applications collecting and processing customer data. The method may include transmitting the customer request and processed customer data from each application to a central authentication system and assessing at the central authentication system a level of risk associated with each customer by accessing each customer profile. The method may additionally include determining based on the level of risk and current policy whether additional customer data is required in order to authenticate each customer and passing each determination back to each transmitting application.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a centralized, risk-based authentication system capable of interfacing with multiple users over multiple diverse channels as well as multiple diverse applications. The authentication system may consider a type of user request, a user profile, an account type, the type of access channel, and other factors in determining appropriate authentication criteria for authentication of the user. The authentication may provide a single point of entry for in-bound and out-bound customer authentications in an environment in which policy can be changed, tested, versioned, and deployed by the business in response to changes in strategy or tactics.

Figure 1A:
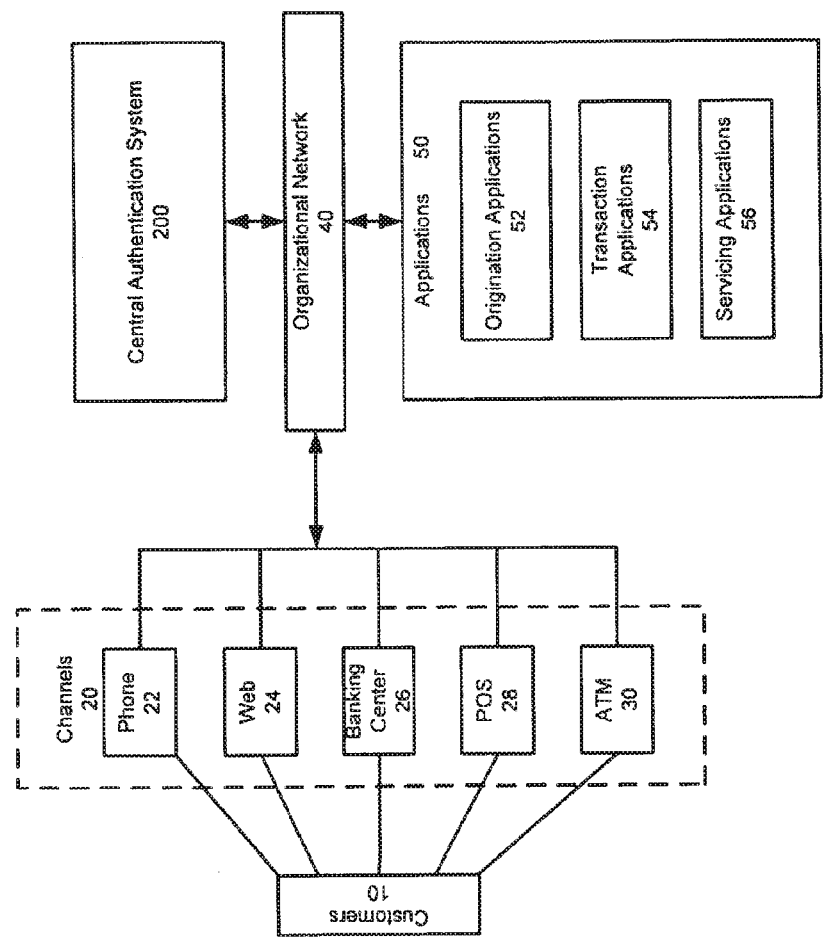
FIG. 1A is a block diagram illustrating an operating environment for a customer authentication system in accordance with an embodiment of the invention.
Figure 1B:
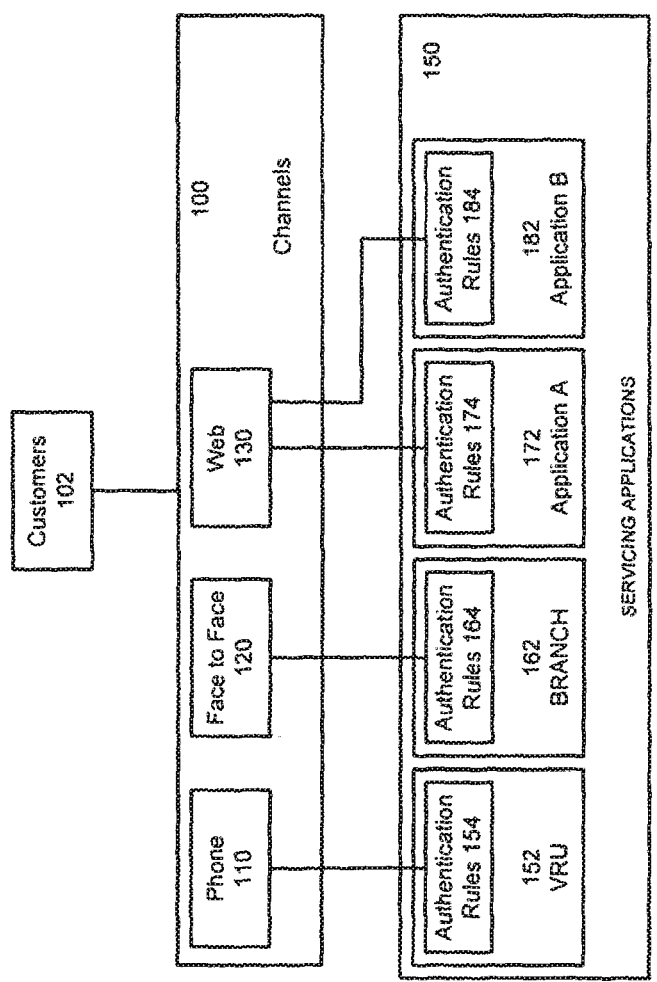
FIG. 1B is a block diagram illustrating an existing operating environment for authentication.

FIG. 1 is a block diagram illustrating an operating environment for a customer authentication system in accordance with an embodiment of the invention. Customers or users 10 connect through channels 20 to an organizational network 40. Over the organizational network 40, customer requests are processed through interaction with a central authentication system 200 and applications 50.

The channels 20 are represented in FIG. 1 by telephone 22, web 24, banking center 26, point of sale (POS) terminal 28, and ATM machine 30. However, these particular channels are merely exemplary and any access point through which a customer can communicate with an organization may qualify as a channel. Typically, a large number of customer access points will be provided for both in-bound and out-bound interactions.

Applications 50 may include origination applications 52, transaction applications 54, and servicing applications 56. Origination applications 52 may serve the customers 10 by establishing accounts or account features. Transaction applications 54 may be accessed by customers 10 in order to execute a financial transaction, such a deposit, withdrawal, or transfer of funds. Servicing applications 56 may be accessed by customers 10 in order to perform various account-related actions, such as changing a customer address or phone number or answering questions about a customer account statement.

Some channels 20 may allow interaction with all three of these types of applications. Other channels 20 may limit interaction to only one or two selected types of applications. For example, the POS terminal 28 may allow connection with only transaction applications 54. The banking center 26 may allow use of origination applications 52, transaction applications 54, and servicing applications 56.

Figure 2:
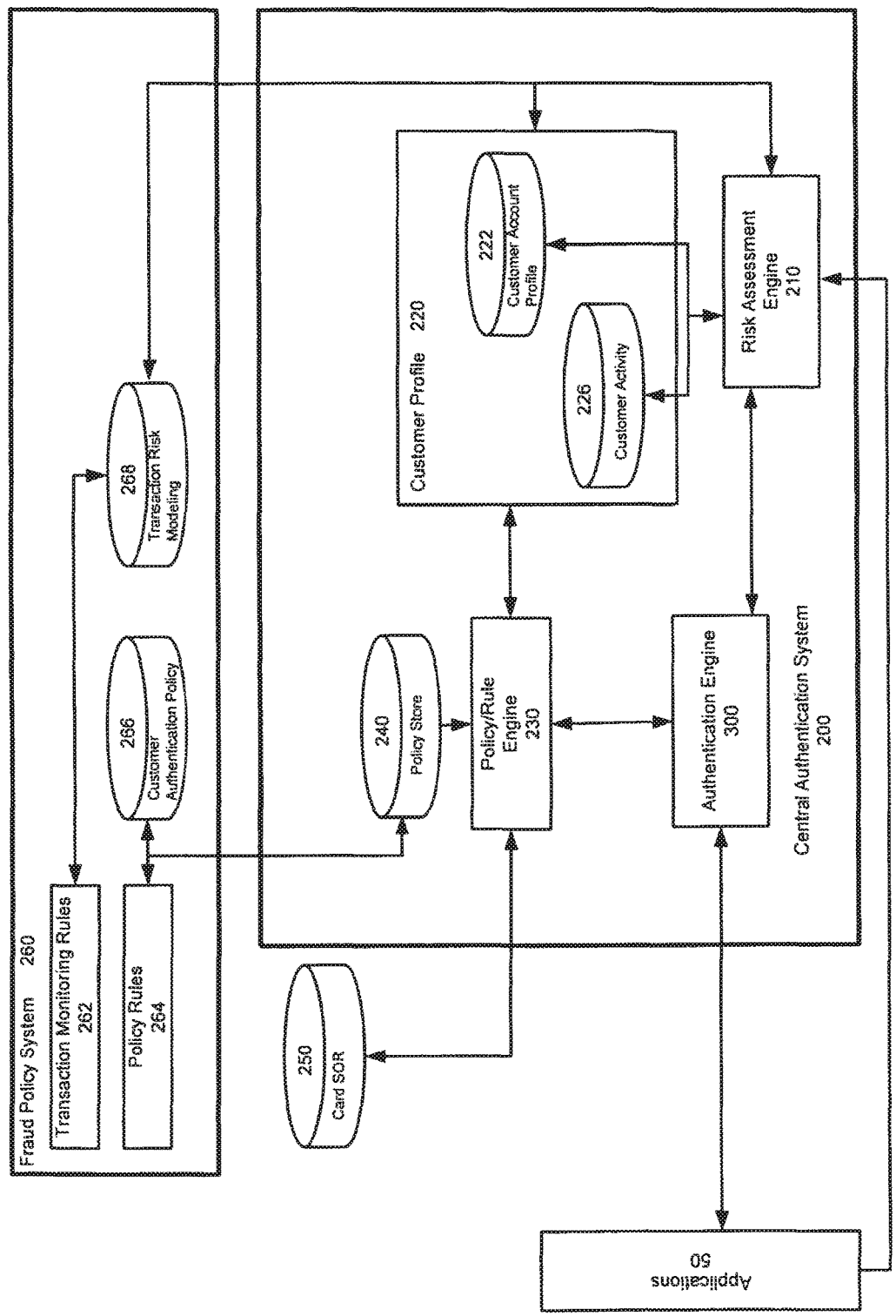
FIG. 2 is a block diagram illustrating an authentication system in accordance with an embodiment of the invention.

The central authentication system 200, which will be further described in FIG. 2 below may operate in conjunction with all of the illustrated channels and applications as a single entry point to apply risk-based policy rules for user authentication.

Although the applications 50 interact with the authentication system 200, the applications also may interface with or may be integrated with application level authentication tools. Such application level authentication tools may include for example, a voice recognition unit in combination with a voice confidence level indicator, fingerprint recognition tools, iris pattern recognition tools, hand print recognition tools, spoken response recognition tools, tone recognition tools, pressure recognition tools, temperature or heartbeat sensors. Other application level authentication tools may include PIN and password recognition components, IP address recognition components, email address verification components, ANI, SIM card recognition, and other similar tools.

All of the components shown in FIGS. 1 and 2 below may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solarism™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The authentication system 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention FIG. 2 is a block diagram illustrating a central authentication system in accordance with an embodiment of the invention. The authentication system 200 interacts with customers through applications 50 and further may interact with a fraud policy system 260 and a card system of record (SOR) 250. The central authentication system 200 may include an authentication engine 300, a policy store 240, and a policy/rule engine 230. The authentication system 200 may additionally include a risk assessment engine 210 and a customer profile 220. For a small business, the customer profile 220 may include a small business profile. Although all of these components are shown as parts of the central authentication system 200, the components may alternatively be integrated with other systems or may function as independent systems that are accessible to the authentication system 200.

The fraud policy system 260 may include transaction monitoring rules 262, policy rules 264, customer authentication policy 266, and transaction risk modeling capability 268. The fraud policy system 260 may be integrated with or comprise a component of the central authentication system 200 or alternatively may be an entirely separate, but cooperative system. The fraud policy system 260 may define and centrally manage and store customer and store authentication policy and customer service request risk through components 262, 264, and 266. The fraud policy system 260 may additionally define and manage the transaction risk model 268, which may be continuously improved by leveraging predictive data. The fraud policy system 260 supports centralized, business managed policy and allows tracking, testing and deployment of criteria and rule sets. Fraud policy is adaptable on a business change cycle and may implement continuous measurement and improvement to adapt to contain evolving threats to secure customer trust. The fraud policy system 260 may respond to changes by adding new authentication credentials, modifying credential sequencing or the number of credentials required, monitoring transactions for risk patterns, and leveraging advancing technologies.

The central authentication system 200 may receive policy for execution as well as the risk transaction model from the fraud policy system 260. As illustrated in FIG. 2, the fraud policy management system 260 may feeds its customer authentication policy 266 to the policy store of the authentication system 200. Furthermore, the fraud policy system 260 may deliver its transaction risk model 268 to the risk assessment engine 210 of the authentication system 200.

The authentication engine 300 is an entry point through the applications 50, regardless of the access channel. The application 50 contacts the central authentication system 200 to initiate an authentication dialog. The authentication engine 300 may then determine customer risk based on information provided by the risk assessment engine 210 and select the appropriate policy based on communication with the policy rule engine 230. Policy selection may be dependent on the channel, application, transaction risk pattern, customer request, and customer or account attributes.

The policy store 240 receives policy after the business change management process is performed by the fraud policy system 260. Thus, the policy store 240 may be refreshed based on cumulative learning of the fraud policy system 260. The data may be provided to the policy store 240 at regularly scheduled intervals, in real time as changes or made, or at other time or task-based intervals as may be desired.

The policy rule engine 230 may contain rule sets that declare the risk-based authentication credentials required to authenticate a customer. Within the policy rule engine 230, credentials may be represented as tasks so they can be swapped or sequenced (e.g., A+B or C where A=SSN, B=DOB, C=challenge questions). The policy rule engine 230 may contain rules for multiple risk levels. For instance, all of the SSN, DOB, and challenge questions may be required to authenticate at a high risk level. A low risk authentication may require only DOB and a medium risk authentication may require two out of three of these criteria. The policy rule engine 230 may receive data from the card SOR 250 that records and stores customers and new card products. The policy rule engine 230 may operate in a manner similar to that disclosed in U.S. Pat. No. 7,058,817, which is hereby incorporated by reference.

The risk assessment engine 210 also receives data through the applications 50 regardless of the access channel. The risk assessment engine 210 further receives information from the transaction risk model 268 so that it can deploy the transaction risk model after validation and completion of the business change management process. The deployment of the transaction risk model 268 enables transparent calculation of a risk assessment. The risk assessment engine 210 supports centralized capture of risk prioritized customer interactions across all channels, enabling interaction risk assessment. As set forth above, the risk assessment may influence the authentication policy presented. The risk assessment engine 210 further records customer events transmitted from applications 50 that have been determined to be fraud to be predictive of risky behavior. The risk assessment engine 210 may perform in a real time mode or batch transaction mode. The risk level influences the level or tier of the authentication policy required. In operation, the risk assessment engine 210 may consider native connection data or degree of risk associated with each channel 20 of FIG. 1. The risk assessment engine 210 may be business configurable and should support risk models and complex event processing rule sets.

The customer profile 220 supports capture of previous customer authentications including point of interaction, time, initial servicing request and outcomes to enable risk assessment. The customer profile 220 may include customer security data such as voiceprint data, fingerprint data, and iris pattern data. The customer profile 220 may additionally include knowledge factors such as password, PIN, proprietary & public record content, and credit bureau data. The customer profile 220 may serve as the SOR for customer activity and action views as well as customer strategy.

Generally speaking, the customer profile 220 may include a customer account profile 22 and a customer activity record 226, both of which may be updated continuously or at regularly scheduled intervals. The customer profile 220 may include a configurable activity window which captures customer interactions that may be predictive of fraud as determined by the fraud policy system 260.

Figure 3:
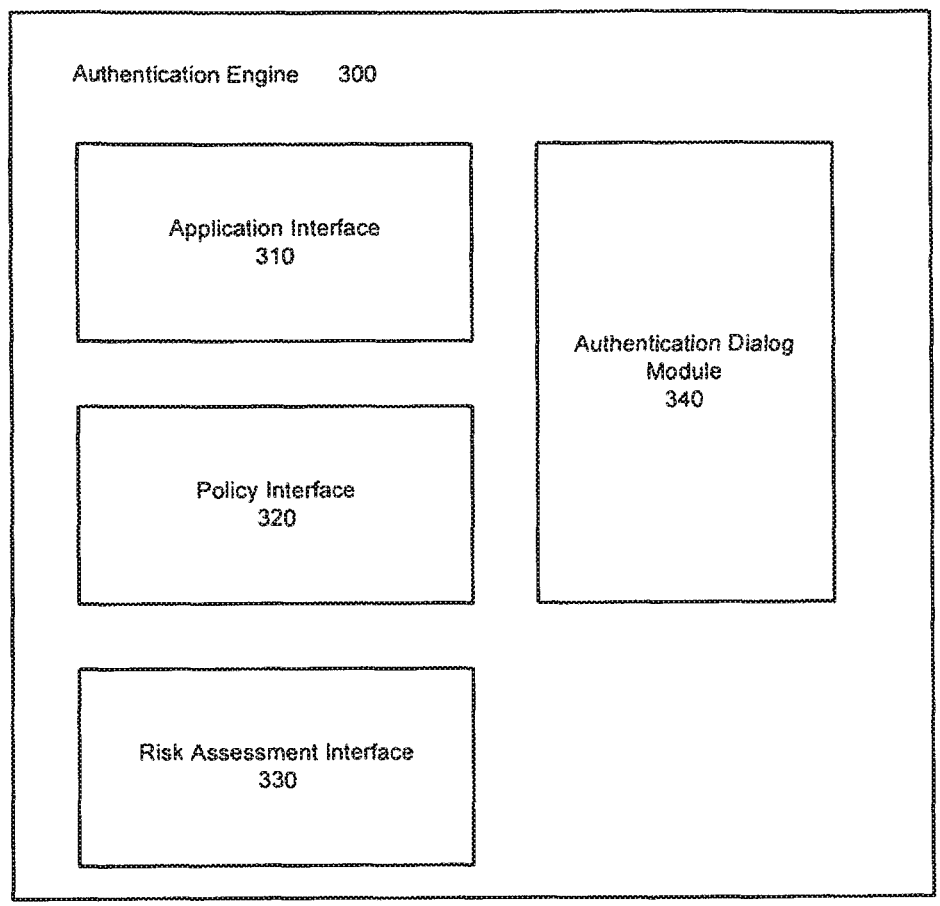
FIG. 3 is a block diagram illustrating an authentication engine in accordance with an embodiment of the invention.

FIG. 3 illustrates details of the authentication engine 300. The authentication engine 300 may include an application interface 310, a policy interface 320, a risk assessment interface 330, and an authentication dialog module 340. Through the authentication dialog module 340, the authentication engine 300 interacts with the applications 50, the policy rule engine 230, and the risk assessment engine 210 to make an appropriate authentication determination. Through the policy interface 320, based on information obtained from the application interface 310 and the risk assessment interface 330, the authentication dialog module 340 may determine whether the user has been authenticated to a level appropriate for the requested transaction. In this instance, if a customer request exceed the required authentication level, the authentication engine 300 may request additional authentication credentials from the application level authentication tools. In embodiments of the invention, if the authentication level approved is only for the requested transaction, subsequent requests that require more security and thus a higher authorization level will require additional credentials to be presented.

In other embodiments, the authentication engine 300 may determine based on application level indicators that a customer is sufficiently authenticated and is free to interact through the channel. Thus, the customer is sufficiently authenticated to perform any and all transactions. While this embodiment would generally require a high level of authentication, it may be more efficient in instances in which a customer has multiple requests that may generate differing risk levels and thus a series of separate authentications.

After initial analysis of data from the application level, the authentication dialog module 340 may determine that additional authentication is required before allowing a customer to perform a requested transaction. In this instance, the authentication engine 300 will request that further information be retrieved from the customer at the application level. Upon receipt of the additional information, the authentication engine 300 may again conduct an authentication dialog in order to authenticate the customer. In embodiments of the invention, the components may operate interactively to create an adaptive system capable of learning from past behaviors. Risk levels associated with the aforementioned factors may be adjusted in accordance with actual risk determined over time through feedback into the system/

Figure 4:
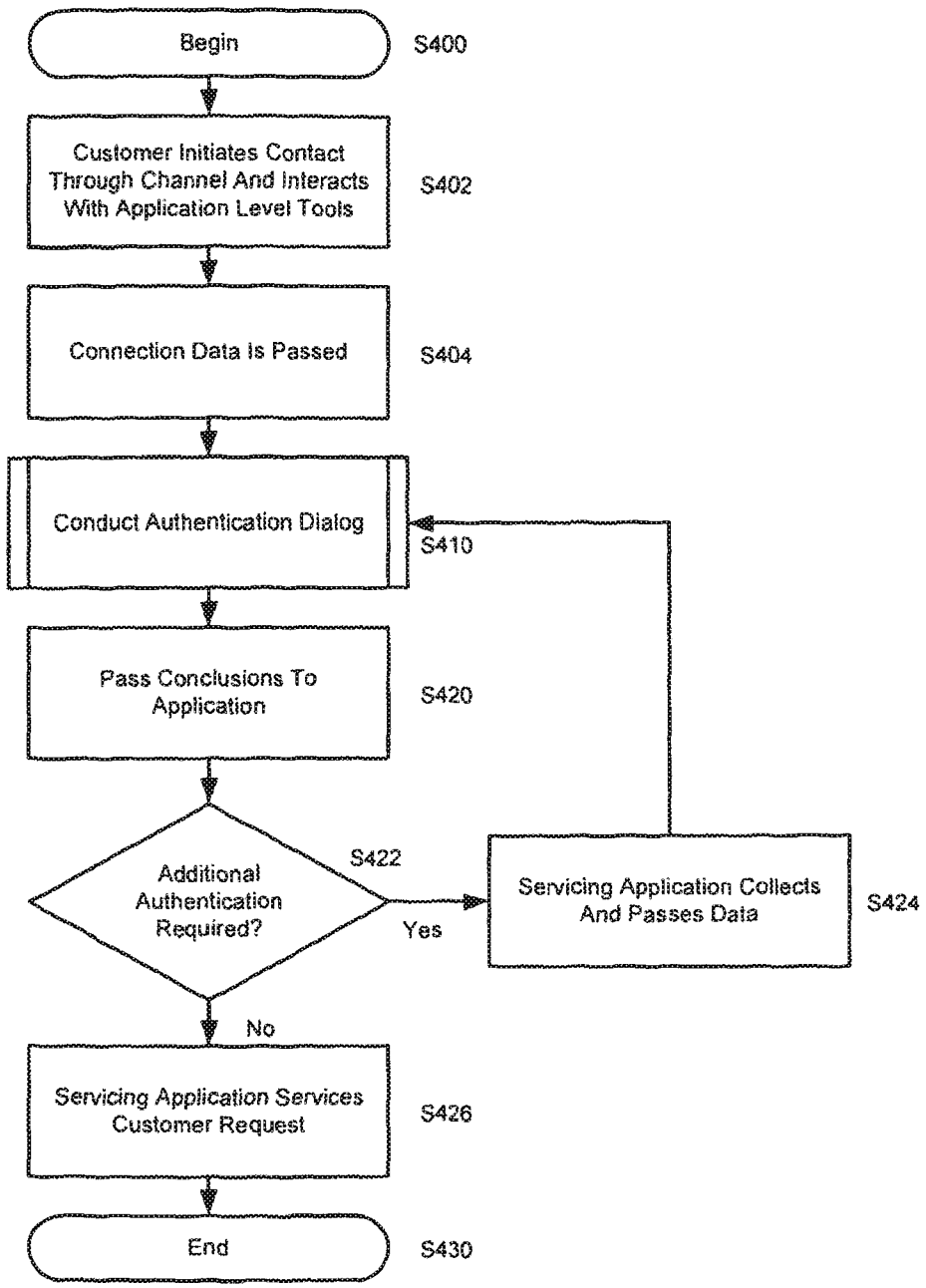
FIG. 4 is a flow chart illustrating processing of the authentication system in accordance with an embodiment of the invention.

FIG. 4 is a flow chart illustrating processing of the authentication system in accordance with an embodiment of the invention. The method begins in S400 and the customer initiates contact through a channel in S402. During this initial contact in S402, an application level interface may collect data from the customer and optionally make an initial evaluation. Connection data and the initial evaluation, if available, are passed through the channel to the network in S404. In S410, the authentication system performs an authentication dialog, which will be further discussed in connection with FIG. 5 below. After the authentication dialog, the authentication system passes its conclusion to the applications in S420. In S422, if additional authentication is required, the application collects and passes additional data to the authentication system in S424. The authentication system again conducts the appropriate dialog. If additional authentication is not required in S422, then the application fulfills the customer request in S426. The process ends in S430.

Figure 5:
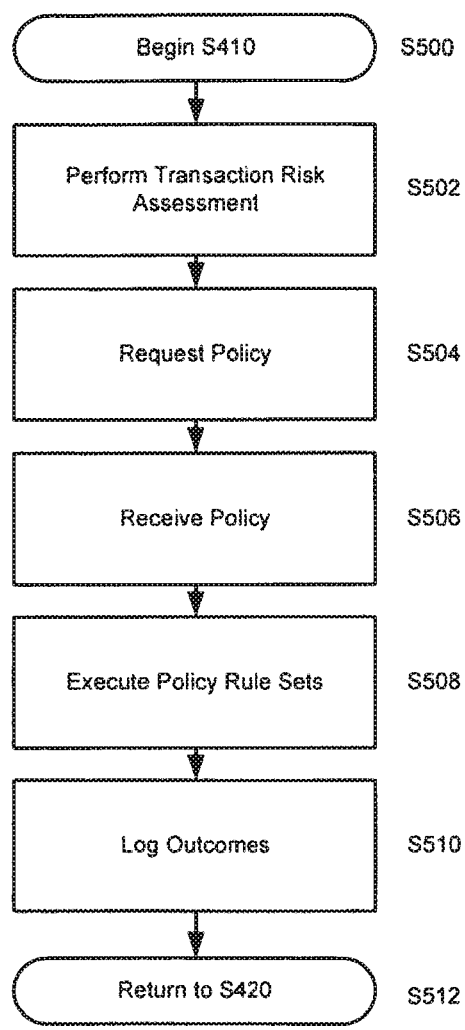
FIG. 5 is a flow chart illustrating an authentication dialog in accordance with an embodiment of the invention.

FIG. 5 is a flow chart illustrating an authentication dialog in accordance with an embodiment of the invention. In S500, the authentication dialog begins. In S502, the authentication engine performs a transaction risk assessment by obtaining information from the risk assessment engine. The information may include one or more of data and conclusions. In S504, the authentication engine requests policy from the policy rule engine. In S508, the authentication engine executes policy rules sets to determine whether, based on existing information, a customer can be authenticated and/or by determining what additional information is necessary in order to authenticate a customer. In S510, the authentication engine logs outcomes. The process ends in S514.

Figure 6:
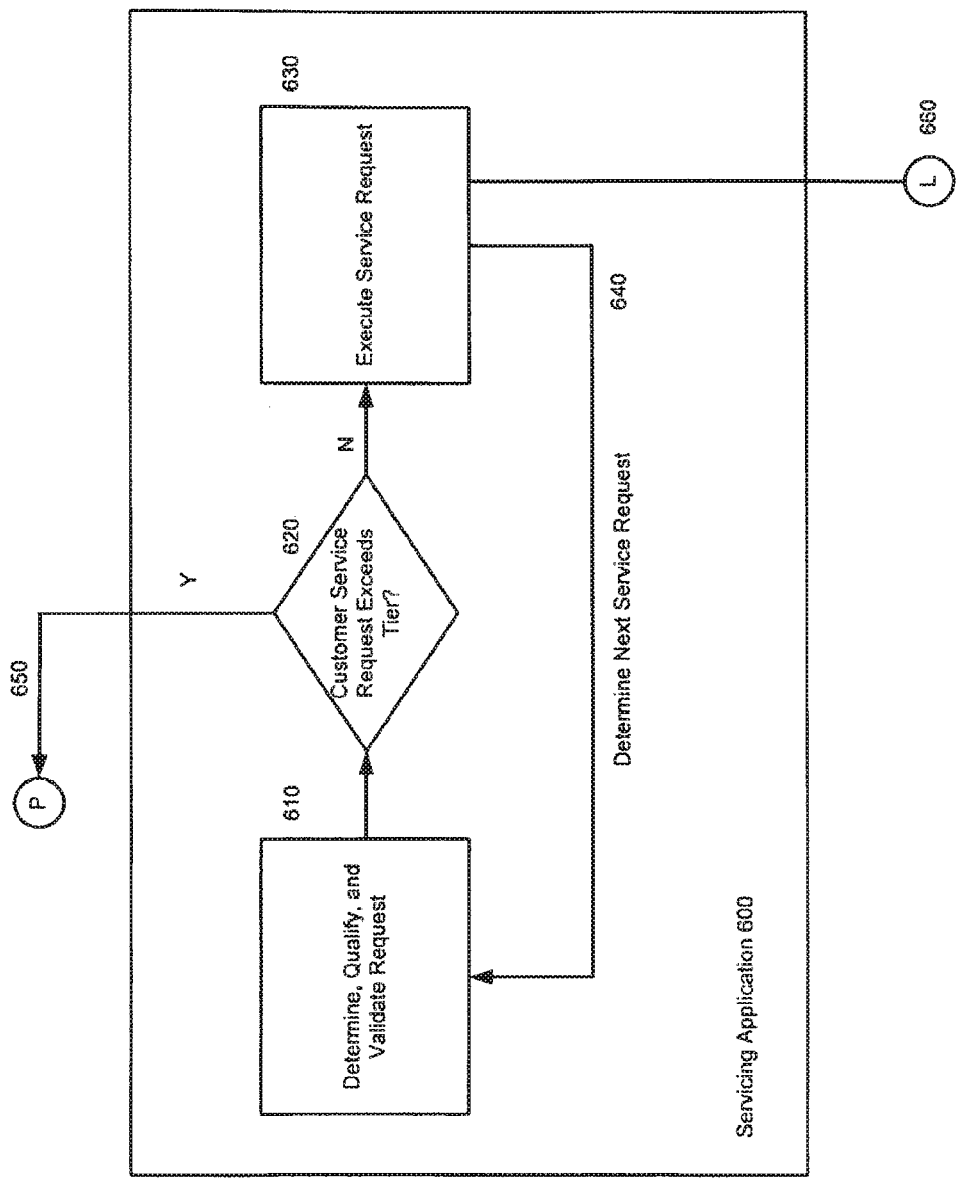
FIG. 6 is a block diagram illustrating a servicing application process when operating in conjunction with an authentication system in accordance with an embodiment of the invention.

FIG. 6 is a block diagram illustrating a servicing application process when operating in conjunction with an authentication system 200 in accordance with an embodiment of the invention. A servicing application 600 determines, qualifies, and validates a request at 610. At 620, the application determines if the customer service request exceeds the tier of authentication provided. If it does exceed the tier, the application returns the information to the authentication system at 650. If the request does not exceed the required tier, the application executes the service request at 630 and sends the execution for logging at 660.

Some practical examples are provided herein in order to illustrate the operation of the methods described in connection with FIGS. 4-6. For example, a customer may initiate interaction with a Card Customer Service (CMS) application in S402 and enter through an automated voice recognition unit (VRU). The CMS application may prompt the customer for information such as an account number. The VRU may interact with a voice authentication service at the application level, passing the account identifier. The voice authentication service at the application level determines if the customer's voice print is on file. If the voiceprint is on file, the VRU prompts the customer to speak, and determines a confidence level, for example a 98% confidence level. The voice authentication service then contacts the authentication system as described herein, and passes the account number, phone number (ANI), customer requested action, and voice confidence level in accordance with S404 as described above with respect to FIG. 4. In S410, the authentication engine conducts an authentication dialog.

As illustrated in FIG. 5, to conduct the authentication dialog, the authentication may perform a risk transaction assessment in S502 by gathering data from the customer profile and the risk scoring engine described above with reference to FIG. 2. For example, the customer profile may provide information regarding recent activity occurring within a set time period. This information may include frequency of phone calls representing this account in a recent time period, frequency of phone calls from this ANI, occurrence of non-monetary change activity on this account, i.e. address/phone/email address/password, occurrence of unusual or large monetary activity on this account, or number of days since voiceprint enrollment. Other information relevant to the transaction risk assessment may be gathered from such sources as an organization website. This information may include customer enrollment history, length of enrollment, frequency of "hits" to site on this customer record in a recent time period, and what transactions have been performed on the web. The website information may also include information on the access device and its location and a determination of whether credentials for login have changed in a recent time period. In addition to the customer profile, additional sources may also be implemented to provide information to the risk scoring or assessment engine. These sources may include, for example, industry partners that may have information relevant to the customers. Furthermore, factors such as the type of customer request, such as whether the request is a balance inquiry, a balance transfer, or a withdrawal may impact an assessed risk level. The channel through which the customer interacts may also impact the assessed risk level.

Other data gathered from the customer profile may include data from other lines of business within the organization. For example, if user is a credit card customer, the data may include mortgage data and banking data. The data may also include determination of recent fraud-related account status and of the account number or caller's phone number on any negative file. Additional data may also be included as appropriate.

In S504 and 506 respectively, the engine may request and receive policy from the policy rule engine and execute the policy rules sets in S508. In this example, the authentication engine finds no attribute or condition from above that meets high-risk threshold singularly or in combination with other attributes. Absent other high risk attributes, the voice confidence of 98% meets a threshold as determined by the policy rule engine for the caller to transact anywhere in the "enterprise" without limitation. The authentication engine logs this outcome and passes it back to the VRU at the application level, which informs the caller he/she has been authenticated.

In preferred embodiments, the total time elapsed for this process is about one second, but may be less than one second or may be several seconds. Should caller request to speak to a representative, the authentication entitlement may be passed from the VRU to the representative's desktop with no additional authentication.

In an alternative scenario, the voice authentication service at the application level may return a confidence level of 63% to the VRU. The VRU operates as described above by passing providing the confidence score and other information to the authentication system.

Again, the authentication engine conducts the authentication dialog by gathering information from internal sources as described above for analysis. In this example, the authentication engine finds no attribute or condition from above that meets high-risk threshold singularly or in combination with other attributes. However, with the voice confidence level of 63%, the authentication engine determines through execution of policy rule sets in S504-508 that additional authentication is necessary. In this example, the account is a credit card/airline frequent flier partnership. The authentication engine therefore sends instructions to the VRU in S420 to prompt the caller for his/her frequent flier member number or current "miles" balance in thousands of miles as additional authentication. The caller complies by entering the frequent flier member number and in S424, the VRU passes this data to the authentication system, which validates the data and returns instructions to the VRU to allow the caller to transact without restriction.

In yet a third scenario, the voice service determines that the customer voiceprint is not enrolled and returns this information to the VRU. The VRU automatically contacts the authentication engine providing information such as the caller's account number, phone number (ANI), and "not enrolled" voice status. As set forth above, the authentication engine gathers data from internal databases to make a risk assessment and implements the policy rule engine. In this example, the authentication engine finds that the home phone number on this account was changed three days ago via an Internet channel, further that the device used in that Internet session had not been used by the customer before then since enrolling in sixty days earlier. However, the authentication requirement in that Internet session was met and no other recent activity is identified by the authentication engine. On the risk level created by this data, based on the policy rule sets, the authentication engine determines it cannot offer voice service enrollment or allow account access to the caller without incremental authentication. Thus it instructs the VRU to prompt the caller to speak the name of the bank from which a payment was made to the account about twenty five days ago. The caller complies and the VRU passes the textual outcome of the caller's utterance back to the authentication engine. The authentication engine compares the text to a database record of the bank name, confirms a match, and instructs the VRU to allow the caller to transact without restriction but to also offer voice service enrollment prior to proceeding.

These examples are merely illustrative and embodiments of the authentication system described herein may be implemented to execute a myriad of authentication interactions. While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. An authentication computing system, the authentication computing system comprising:
   a non-transitory memory storing at least a risk policy and a customer database that includes at least customer account information;
   at least one computer processor coupled to the memory, executing instructions to perform at least the following:
      receiving an authentication request from at least one communication channel, wherein the authentication request is received through an authentication dialog on a user interface;
      wherein in response to receiving the authentication request from at least one communication channel, the at least one computer processor is activated to automatically perform at least the following:
         retrieving and recording at least a portion of a customer activity with respect to a customer account;
         determining one of more than two risk levels associated with the customer account by accessing rule sets for multiple risk levels associated with the policy, wherein the one of more than two risk levels account for recorded customer activity predictive of risky behavior and wherein the step of determining the one of more than two risk levels further comprises generating a confidence level value, and wherein the determining whether to approve the authentication request is further based on a comparison of the confidence level value and a confidence level value threshold;

determining, through the at least one computer processor, whether to approve the authentication request based on the authentication request, the one of more than two risk levels and application request activity associated with the customer account;

transmitting an authentication result based on determining whether to approve the authentication request; and updating the customer account.

2. The authentication computing system of claim 1, wherein the step of determining whether to approve the authentication request further comprises executing a risk policy.

3. The authentication computing system of claim 1, wherein the step of determining the one of more than two risk levels comprises:

selecting a policy stored in non-transitory memory based on the authentication request; and retrieving the policy from the policy store.

4. Then authentication computing system of claim 3, wherein the selecting of the policy from the policy store is based on at least one of the following associated with the authentication request: communication channel, application, transaction risk pattern, and customer account attribute.

5. The authentication computing system of claim 1, wherein the at least one computer processor further executes computer instructions to perform at least the following:

setting policy and risk parameters at the central authentication system; and monitoring operation of the authentication computing system.

6. The authentication computing system of claim 5, wherein the customer database stores customer security data, customer activity, including customer transactions, and the customer account profile.

7. The authentication computing system of claim 1, wherein the at least one computer processor further executes computer instructions to perform at least the following:

receiving customer event information from at least one application;

updating at least one of a risk policy and a customer account associated with the customer event information; and authenticating a second authentication request based on the updated at least one of a risk policy and a customer account.

8. The authentication computing system of claim 1, wherein the authentication computing system receives receive authentication requests from multiple applications that include an origination application, a transaction application, and a servicing application, wherein the origination application establishes accounts and account features, the transactions application executes financial transactions, and the servicing application performs account related actions including customer profile changes and answering questions.

9. The authentication computing system of claim 1, wherein the at least one computer processor further executes computer instructions to perform at least the following:

determining additional customer authentication information is required for authentication of the authentication request;

transmitting request to an application associated with the request for additional customer authentication information based on the policy, the request causing the application to request a customer to provide additional information authenticating the customer;

receiving additional customer authentication information from the application; and processing the additional customer authentication information to determine whether to authenticate the authentication request.

10. The authentication computing system of claim 1, wherein the authentication computing system receives authentication requests from multiple channels, including at least two of telephone, mobile device, internet, banking center, POS terminal, and ATM.

11. The authentication computing system of claim 1, further comprising application level authentication tools selected for each channel, wherein the authentication level authentication tools passes received authentication information to the authentication computing system.

12. The authentication computing system of claim 11, wherein the application level authentication tools include at least one of fingerprint recognitions, a voice recognition unit with a voice confidence level indicator, fingerprint recognition tools, iris pattern recognition tools, hand print recognition tools, spoken response recognition tools, tone recognition tools, pressure recognition tools, password recognition tools, PIN recognition tools, IP address recognition components, email address verification components, ANI, and SIM card recognition.

13. A computer-implemented method for providing authentication of a customer of a financial institution making a request related to a customer account of the financial institution from a receiving application through any one of multiple channels, the method comprising:

receiving, using at least one computer processor, an authentication request from at least one communication channel, wherein the authentication request is received through an authentication dialog on a user interface;

wherein in response to receiving the authentication request from at least one communication channel, the at least one computer processor is activated to automatically perform at least the following:

retrieving and recording at least a portion of a customer activity with respect to a customer account;

determining one of more than two risk levels associated with the customer account by accessing rule sets for multiple risk levels associated with the policy, wherein the one of more than two risk levels accounts for recorded customer activity predictive of risky behavior and wherein the step of determining the one of more than two risk levels further comprises generating a confidence level value, and wherein the determining whether to approve the authentication request is further based on a comparison of the confidence level value and a confidence level value threshold;

determining, through the at least one computer processor, whether to approve the authentication request based on the authentication request, the one of more than two risk levels and application request activity are associated with the customer account;

transmitting an authentication result based on the step of determining whether to approve the authentication request; and updating the customer account.

14. The method of claim 13, wherein the step of determining whether to approve the authentication request further comprises executing a risk policy.

15. The method of claim 13, wherein the step of determining the one of more than two risk levels further comprises:
 selecting a policy stored in non-transitory memory based on the authentication request; and
 retrieving the policy from the policy store.

16. The method of claim 15, wherein the selecting of the policy from the policy store is based on at least one of the following associated with the authentication request: communication channel, application, transaction risk pattern, and customer account attribute.

17. The method of claim 13, further comprising executing computer instructions to perform at least the following:
 setting policy and risk parameters at the central authentication system; and
 monitoring operation of the authentication computing system.

18. The method of claim 13, further comprising storing in a customer database customer security data, customer activity, including customer transactions, and the customer account profile.

19. The method of claim 13, further executing computer instructions to perform at least the following:
 receiving customer event information from at least one application;
 updating at least one of a risk policy and a customer account associated with the customer event information; and
 authenticating a second authentication request based on the updated at least one of a risk policy and a customer account.

20. The method of claim 13, wherein the step of determining the one of more than two risk levels further comprises generating a confidence level value, and wherein the determining whether to approve the authentication request further based on a comparison of the confidence level value and a confidence level value threshold.

21. The method of claim 13, further comprising receiving requests from multiple applications that include an origination application, a transaction application, and a servicing application, wherein the origination application establishes accounts and account features, the transactions application executes financial transactions, and the servicing application performs account related actions including customer profile changes and answering questions.

22. The method of claim 13, further comprising executing computer instructions to perform at least the following:
 determining additional customer authentication information is required for authentication of the authentication request;
 transmitting request to an application associated with the request for additional customer authentication information based on the policy, the request causing the application to request a customer to provide additional information authenticating the customer;
 receiving additional customer authentication information from the application; and
 processing the additional customer authentication information to determine whether to authenticate the authentication request.

23. The computer-implemented method of claim 13, wherein the multiple channels include at least two of telephone, mobile device, internet, banking center, POS terminal, and ATM.

24. The computer-implemented method of claim 13, further comprising receiving authentication information from application level authentication tools associated with each channel.

25. The computer-implemented method of claim 24, wherein the application level authentication tools include at least one of fingerprint recognitions, a voice recognition unit with a voice confidence level indicator, fingerprint recognition tools, iris pattern recognition tools, hand print recognition tools, spoken response recognition tools, tone recognition tools, pressure recognition tools, password recognition tools, PIN recognition tools, IP address recognition components, email address verification components, ANI, and SIM card recognition.

* * * * *